(12) United States Patent
Kakutani (10) Patent No.: US 10,327,144 B2
(45) Date of Patent: Jun. 18, 2019

(54) PRINTING APPARATUS FOR PERFORMING WIRELESS COMMUNICATION, METHOD FOR CONTROLLING PRINTING APPARATUS, AND STORAGE MEDIUM

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/138,929

(22) Filed: Apr. 26, 2016

(65) Prior Publication Data

US 2016/0330628 A1 Nov. 10, 2016

(30) Foreign Application Priority Data

May 8, 2015 (JP) ................. 2015-095887

(51) Int. Cl.
*H04W 12/08* (2009.01)
*H04W 12/02* (2009.01)
*H04W 88/08* (2009.01)

(52) U.S. Cl.
CPC .......... *H04W 12/08* (2013.01); *H04W 12/02* (2013.01); *H04W 88/08* (2013.01)

(58) Field of Classification Search
CPC ......... G06F 2221/0788; G06F 2221/00; H04L 29/08306; H04L 29/08333; H04L 29/08342; H04L 29/08369; H04W 12/08; H04W 12/02; H04W 88/08
USPC ................................. 455/41.1–41.3
See application file for complete search history.

(56) References Cited

U.S. PATENT DOCUMENTS

| 5,497,422 | A | * | 3/1996 | Tysen | G06F 21/64 |
| | | | | | 713/157 |
| 8,909,600 | B2 | * | 12/2014 | Numakami | G06F 17/30575 |
| | | | | | 707/610 |
| 2005/0195781 | A1 | * | 9/2005 | Ikeda | H04W 48/12 |
| | | | | | 370/338 |
| 2008/0004506 | A1 | * | 1/2008 | Ikeda | A61B 6/465 |
| | | | | | 600/300 |
| 2012/0243664 | A1 | * | 9/2012 | Nishii | A61B 6/465 |
| | | | | | 378/98.2 |
| 2013/0132338 | A1 | * | 5/2013 | Numakami | G06F 17/30575 |
| | | | | | 707/610 |
| 2014/0293331 | A1 | * | 10/2014 | Asai | G06F 3/1286 |
| | | | | | 358/1.15 |
| 2015/0143357 | A1 | * | 5/2015 | Shin | H04L 41/24 |
| | | | | | 717/170 |
| 2016/0066353 | A1 | * | 3/2016 | Kumar | H04W 12/06 |
| | | | | | 709/227 |
| 2016/0269394 | A1 | * | 9/2016 | Zhong | H04W 12/06 |

(Continued)

FOREIGN PATENT DOCUMENTS

JP 2015-23440 A 2/2015

*Primary Examiner* — Nay A Maung
*Assistant Examiner* — Angelica M Perez
(74) *Attorney, Agent, or Firm* — Canon U.S.A., Inc. IP Division (57) ABSTRACT

A communication apparatus displays connection information for an external device to perform wireless connection with the communication apparatus, determines whether a wireless connection based on the connection information is established, and hides the connection information according to establishment of the wireless connection.

24 Claims, 6 Drawing Sheets

(56) References Cited

U.S. PATENT DOCUMENTS

2016/0360066 A1* 12/2016 Park ..................... G06F 3/1296
2017/0201583 A1* 7/2017 Leyman ................. H04L 67/12

* cited by examiner

SETTING SCREEN 400

PRINTING APPARATUS FOR PERFORMING WIRELESS COMMUNICATION, METHOD FOR CONTROLLING PRINTING APPARATUS, AND STORAGE MEDIUM

BACKGROUND

Field of the Invention

The present invention relates to a communication apparatus for performing wireless communication.

Description of the Related Art

A communication apparatus such as a smartphone, a tablet personal computer (PC), and a printing apparatus has wireless communication functions. Among the wireless communication functions, there has been known a direct wireless communication mode in which a plurality of communication apparatuses is directly connected without the intervention of an access point. Japanese Patent Application Laid-Open No. 2015-23440 discusses a configuration in which a printing apparatus and a mobile terminal are directly connected by using a software access point mode, which is an example of the direct wireless communication mode.

If a plurality of communication apparatuses is connected by using the direct communication mode, a first communication apparatus is made to operate as an access point. A second communication apparatus is made to connect to the first communication apparatus. Conventionally, the first communication apparatus displays a service set identifier (SSID). Then, the user inputs the SSID into the second communication apparatus or selects the SSID from a search result of access points, whereby a wireless connection between the first and second communication apparatuses is established.

As described above, if a plurality of communication apparatuses is connected by using the direct wireless communication mode, connection information (for example, SSID) required to establish the wireless connection needs to be displayed. With conventional communication apparatuses, the connection information continues to be displayed after the wireless communication in the direct wireless communication mode is established. The reason is that the user who has checked the displayed connection information does not necessarily stay by the first communication apparatus when the wireless connection in the direct wireless communication mode is established, and an operation to hide the displayed connection information is not performed. If the connection information required to establish the wireless connection is left displayed, for example, the possibility of the connection information being known to a third party (for example, a user who is not authorized to use the first communication apparatus) increases.

SUMMARY

According to an aspect of the present invention, a communication apparatus includes a wireless communication unit configured to perform wireless communication, a display unit configured to display connection information for an external device to perform wireless communication with the communication apparatus, a determination unit configured to determine whether a wireless connection based on the connection information is established, and a control unit configured to hide the connection information according to a determination made by the determination unit that the wireless connection is established.

Further features of aspects of the present invention will become apparent from the following description of exemplary embodiments with reference to the attached drawings.

DESCRIPTION OF THE EMBODIMENTS

Exemplary embodiments of the present invention will be described below with reference to the drawings. The following exemplary embodiments are not intended to limit the aspects of the invention set forth in the claims. Not all combinations of features described in the exemplary embodiments are needed to implement the aspects of the invention.

Figure 1:
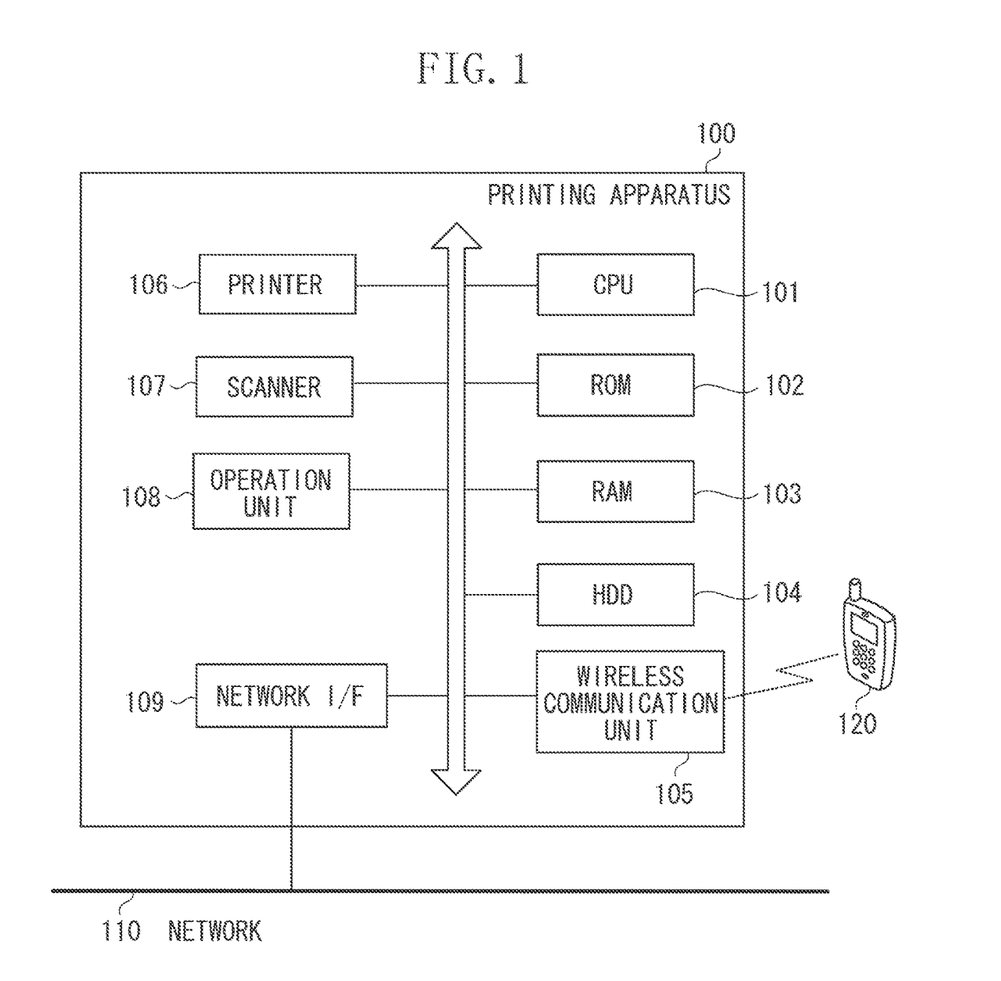
FIG. 1 is a block diagram illustrating a configuration of a printing apparatus.

First, a hardware configuration of a printing apparatus 100 according to a first exemplary embodiment will be described with reference to FIG. 1. The printing apparatus 100 according to the present exemplary embodiment is assumed to be a multifunction peripheral, but may be a printer without a scanner function.

A central processing unit (CPU) 101 reads a control program stored in a read-only memory (ROM) 102, and performs various types of processing for controlling an operation of the printing apparatus 100. A random access memory (RAM) 103 is used as a temporary storage area such as a main memory and a work area of the CPU 101. A hard disk drive (HDD) 104 stores various types of data such as print data and a scanned image.

The printing apparatus 100 is configured in such a manner that a single CPU 101 performs each process illustrated in a flowchart to be described below. However, other configurations may be employed. For example, a plurality of CPUs may cooperate to perform each process illustrated in the flowchart to be described below. Part of the processing illustrated in the flowchart may be performed by using a hardware circuit.

A printer 106 performs print processing on a sheet based on print data received from an external device or a scanned image generated by a scanner 107. The scanner 107 reads a document to generate a scanned image. The scanned image generated by the scanner 107 is printed by the printer 106 or stored in the HDD 104.

An operation unit 108 includes a liquid crystal display having a touch panel function, and a keyboard. The operation unit 108 displays various operation screens. The user can input instructions and information into the printing apparatus 100 via the operation unit 108.

A network interface (I/F) 109 connects to a network 110 and performs communication with an external device (such as a PC) on the network 110. The network I/F 109 receives print data transmitted from the external device, and the printer 106 performs print processing based on the received print data.

A wireless communication unit 105 has a wireless local area network (LAN) function. The wireless communication unit 105 can operate in either of an infrastructure mode or a software access point (AP) mode. If the wireless communication unit 105 operates in the infrastructure mode, the wireless communication unit 105 performs wireless communication with an external access point (not illustrated).

If the wireless communication unit 105 operates in the software AP mode, the wireless communication unit 105 does not perform wireless communication with an external access point. Instead, the wireless communication unit 105 itself behaves as an access point. A mobile terminal 120 wirelessly connects to the wireless communication unit 105 operating in the software AP mode, whereby the mobile terminal 102 and the printing apparatus 100 can perform direct wireless communication therebetween. In the following description, the software AP mode will be referred to as a soft AP mode. After a wireless connection between the mobile terminal 120 and the printing apparatus 100 is established by using the soft AP mode, the mobile terminal 120 can, for example, transmit print data for printing a picture stored in the mobile terminal 120 to the printing apparatus 100 and the printing apparatus 100 can print the picture.

The printing apparatus 100 is described as an example of a communication apparatus that can operate in the soft AP mode. The communication apparatus to which an exemplary embodiment of the present invention is applicable is not limited to the printing apparatus 100. An exemplary embodiment of the present invention may be applied to various electronic devices that can operate in the soft AP mode. Examples include, but are not limited to, a digital camera, a video camera, a smartphone, and a tablet PC.

Figure 2A:
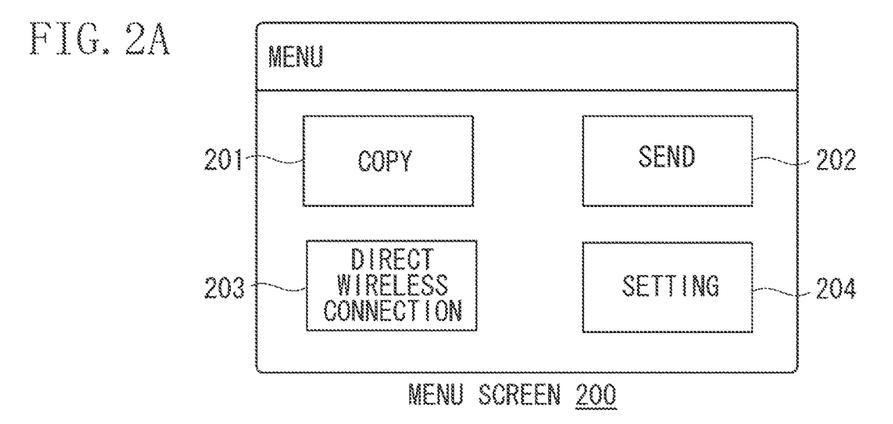
FIGS. 2A, 2B, and 2C are diagrams illustrating screens displayed by the printing apparatus.

Next, an operation procedure for connecting a user's mobile terminal (for example, mobile terminal 120) to the printing apparatus 100 by using the soft AP mode will be described with reference to FIGS. 2A, 2B, and 2C. A menu screen 200 of FIG. 2A is a screen displayed by the operation unit 108. A button 201 is a button for using a copy function. If the user selects (in the case of a touch panel, touches) the button 201, the operation unit 108 displays a copy screen. A button 202 is a button for using a send function (function for transmitting a document image read by the scanner 107 to an external device on the network 110). If the user selects the button 202, a send screen is displayed. A button 204 is a button for displaying various setting screens.

A button 203 is a button for displaying connection information required to connect to the printing apparatus 100 operating in the soft AP mode. If the user selects the button 203, the wireless communication unit 105 generates an SSID and displays the generated SSID. The user checks the SSID. If the user inputs the checked SSID into the mobile terminal 120 or selects the checked SSID from a search result list of access points, a wireless connection is established between the printing apparatus 100 and the mobile terminal 120. In the case of the printing apparatus 100 according to the present exemplary embodiment, the SSID is generated at random. However, a fixed SSID may be used. The SSID may be generated not only at a timing when the button 203 is selected by the user, but at a different timing as well. Examples thereof include when the printing apparatus 100 is activated.

Figure 2B:
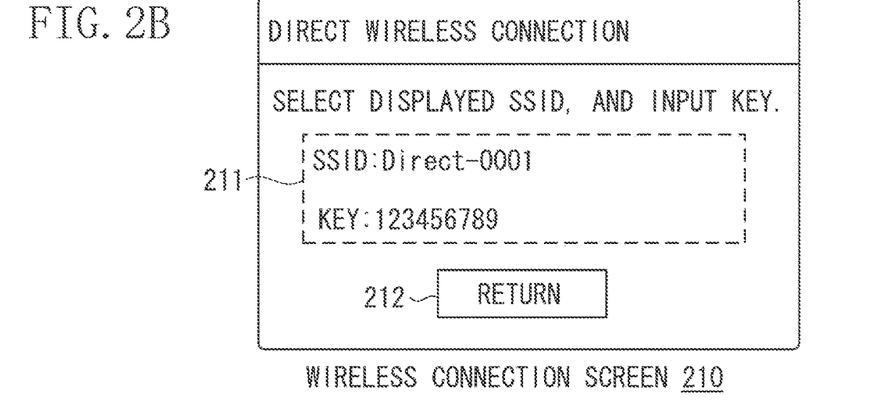

If the user selects the button 203, the operation unit 108 displays a wireless connection screen 210 of FIG. 2B. A display area 211 of the wireless connection screen 210 displays the connection information required to establish a wireless connection in the soft AP mode, i.e., the SSID and a key generated by the printing apparatus 100. If the user selects a button 212, the operation unit 108 changes the display screen from the wireless connection screen 210 to the menu screen 200.

From the wireless connection screen 210, the user can find out the connection information required to establish a wireless connection in the soft AP mode. If the wireless connection screen 210 is left displayed after the establishment of the wireless connection, the possibility of the connection information being known to a third party increases. The present exemplary embodiment is then characterized in that the connection information is hidden after the establishment of the wireless connection in the soft AP mode. For example, if the wireless connection in the soft AP mode is established while the wireless connection screen 210 is displayed, the printing apparatus 100 changes the display screen from the wireless connection screen 210 to the menu screen 200. The connection information (in the present exemplary embodiment, the SSID and the key displayed in the display area 211) can be hidden in such a manner.

The connection information may be hidden by other methods. For example, if the wireless connection in the soft AP mode is established while the wireless connection screen 210 is displayed, the printing apparatus 100 may display an object such as a popup 221, like a wireless connection screen 220 of FIG. 2C. The connection information can thus be hidden behind an object such as a popup display. If the user selects a button 222 included in the popup 221, the operation unit 180 displays the menu screen 200.

Figure 3:
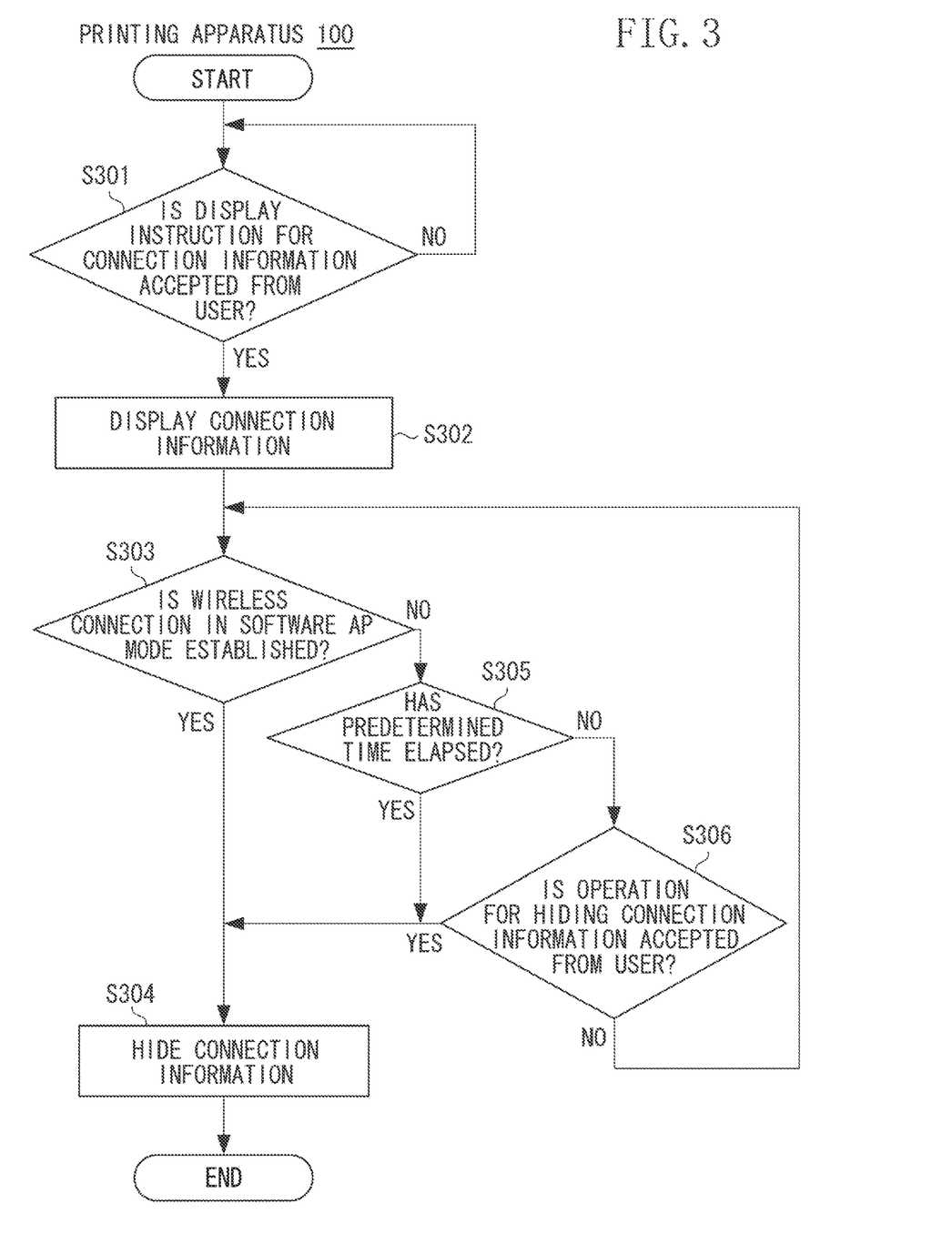
FIG. 3 is a flowchart illustrating processing performed by the printing apparatus according to a first exemplary embodiment.

Next, processing for hiding the connection information will be described with reference to a flowchart of FIG. 3. The processing illustrated in the flowchart of FIG. 3 is processing to be performed when the operation unit 108 displays the menu screen 200. Each step illustrated in the flowchart of FIG. 3 is processed by the CPU 101 loading a control program stored in a memory such as the ROM 102 into the RAM 103 and executing the control program.

In step S301, the CPU 101 determines whether a display instruction for the connection information is accepted from the user. In the present exemplary embodiment, if the user selects the button 203 in the menu screen 200, the CPU 101 determines that a display instruction for the connection information is accepted from the user (YES in step S301), and the processing proceeds to step S302. On the other hand, if a display instruction for the connection information is determined not to be accepted from the user (NO in step S301), the CPU 101 waits until a display instruction for the connection information is accepted from the user.

Next, step S302 will be described. In step S302, the CPU 101 displays the connection information. In the present exemplary embodiment, the operation unit 108 displays the wireless connection screen 210 including the SSID and the key, which are the connection information.

Figure 2C:
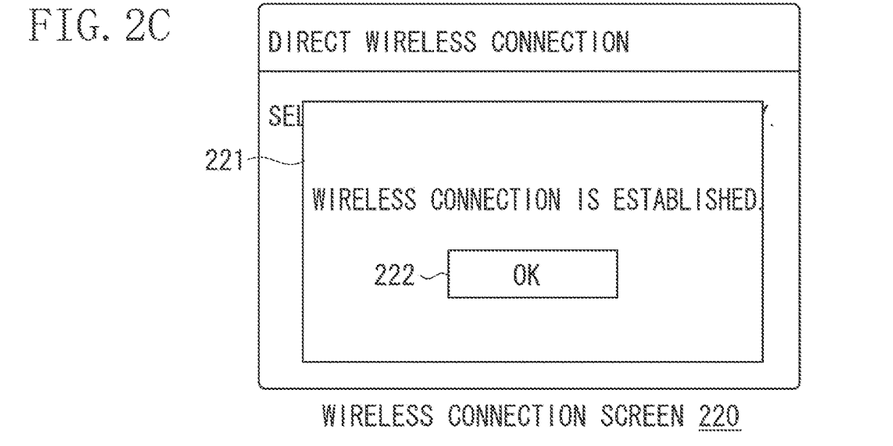

In step S303, the CPU 101 determines whether a wireless connection in the soft AP mode is established. In the present exemplary embodiment, if a wireless connection with respect to the SSID generated by the CPU 101 (SSID displayed in the display area 211) is established, the CPU 101 determines that a wireless connection in the soft AP mode is established. If the CPU 101 determines that a wireless connection in the soft AP mode is established (YES in step S303), the processing proceeds to step S304. In step S304, the CPU 101 hides the connection information. In the present exemplary embodiment, the CPU 101 hides the connection information by changing the display screen from the wireless connection screen 210 to the menu screen 200. Alternatively, the CPU 101 hides the connection information by displaying the popup 221.

In step S303, if the CPU 101 determines that a wireless connection in the soft AP mode is not established (NO in step S303), the processing proceeds to step S305. In step S305, the CPU 101 determines whether a predetermined time (for example, five minutes) has elapsed while the wireless connection screen 210 is displayed. In the present exemplary embodiment, the CPU 101 starts to count time at a timing when the wireless connection screen 210 is displayed in step S302. In step S305, if the CPU 101 determines that the predetermined time has elapsed while the wireless connection screen 210 is displayed (YES in step S305), the processing proceeds to step S304. In step S304, the CPU 101 hides the displayed connection information.

In step S305, if the CPU 101 determines that the predetermined time has not elapsed (NO in step S305), the processing proceeds to step S306. In step S306, the CPU 101 determines whether an operation for hiding the connection information is accepted from the user. In the present exemplary embodiment, if the user selects the button 212, the CPU 101 determines that the operation for hiding the connection information is accepted from the user (YES in step S306), and the processing proceeds to step S304. In step S304, the CPU 101 hides the displayed connection information. On the other hand, if the operation for hiding the connection information is not accepted from the user (NO in step S306), the processing returns to step S303.

As described above, the present exemplary embodiment is characterized in that the connection information required to establish a wireless connection in the soft AP mode is hidden according to the establishment of the wireless connection. This can reduce the possibility that the connection information required to establish the wireless connection may be known to a third party.

According to the present exemplary embodiment, even if the wireless connection in the soft AP mode is not established, the connection information is hidden according to a lapse of a predetermined time while the wireless connection screen 210 is displayed. Consequently, even if the user who has made the operation to display the wireless connection screen 210 does not proceed with the wireless connection in the soft AP mode for some reason, the possibility that the connection information required to establish the wireless connection may be known to a third party can be reduced.

Next, a second exemplary embodiment will be described as a modification of the first exemplary embodiment. In the first exemplary embodiment, if a wireless connection in the soft AP mode is established, the connection information required to establish the wireless information is hidden without exception. The present exemplary embodiment deals with a configuration for switching between hiding and continuing to display the connection information required to establish a wireless connection in the soft AP mode if the wireless connection is established. A printing apparatus 100 according to the present exemplary embodiment has similar hardware configuration to that of the first exemplary embodiment. The description will be given using the configuration described in FIG. 1.

Figure 4:
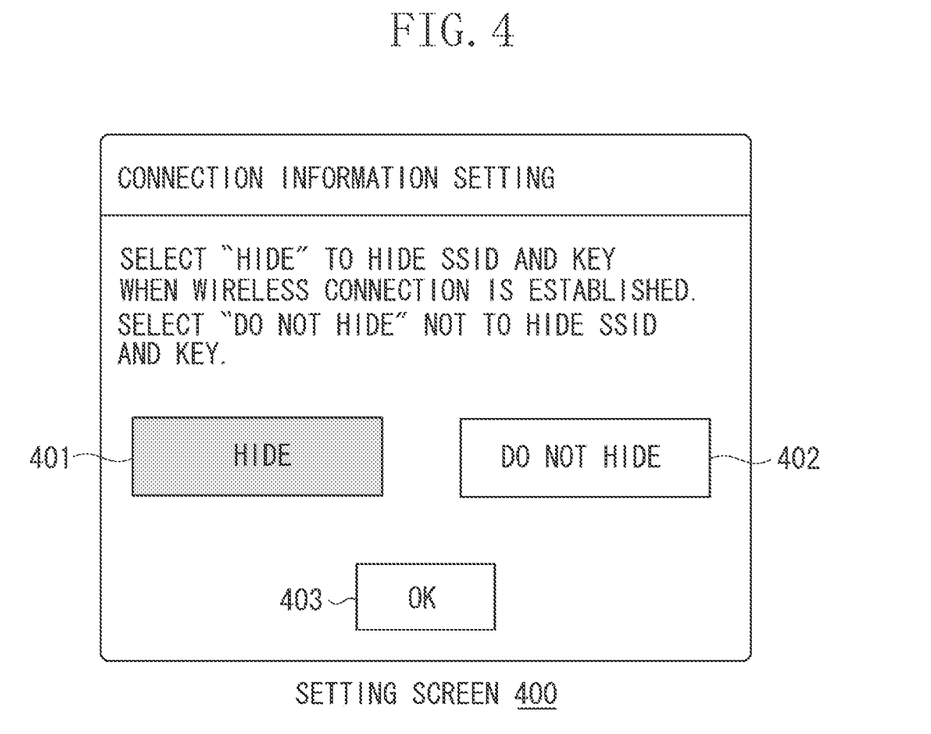
FIG. 4 is a diagram illustrating a setting screen.

A setting screen 400 of FIG. 4 is a screen for the user (for example, a system administrator) to set whether to hide or continue to display the connection information required to establish a wireless connection in the soft AP mode if the wireless connection is established. The setting screen 400 is displayed by the operation unit 108.

If the user wants to hide the connection information according to the establishment of the wireless connection in the soft AP mode, the user selects an icon 401. On the other hand, if the user wants to continue displaying the connection information if the wireless connection in the soft AP mode is established, the user selects an icon 402. If the user selects an OK button 403, the setting result of the setting screen 400 is stored as a device setting into a memory, such as the HDD 104. As illustrated, the setting screen 400 reflects a state where the icon 401 was selected.

If the user wants to give higher priority to reducing the possibility of the connection information being known to a third party, it is desirable for the user to select the icon 401. On the other hand, if, for example, the user wants to connect a plurality of mobile terminals to the printing apparatus 100, it is more convenient to maintain the display of the connection information than to hide the connection information according to the establishment of a wireless connection. In such a use environment, it is desirable for the user to select the icon 402.

Figure 5:
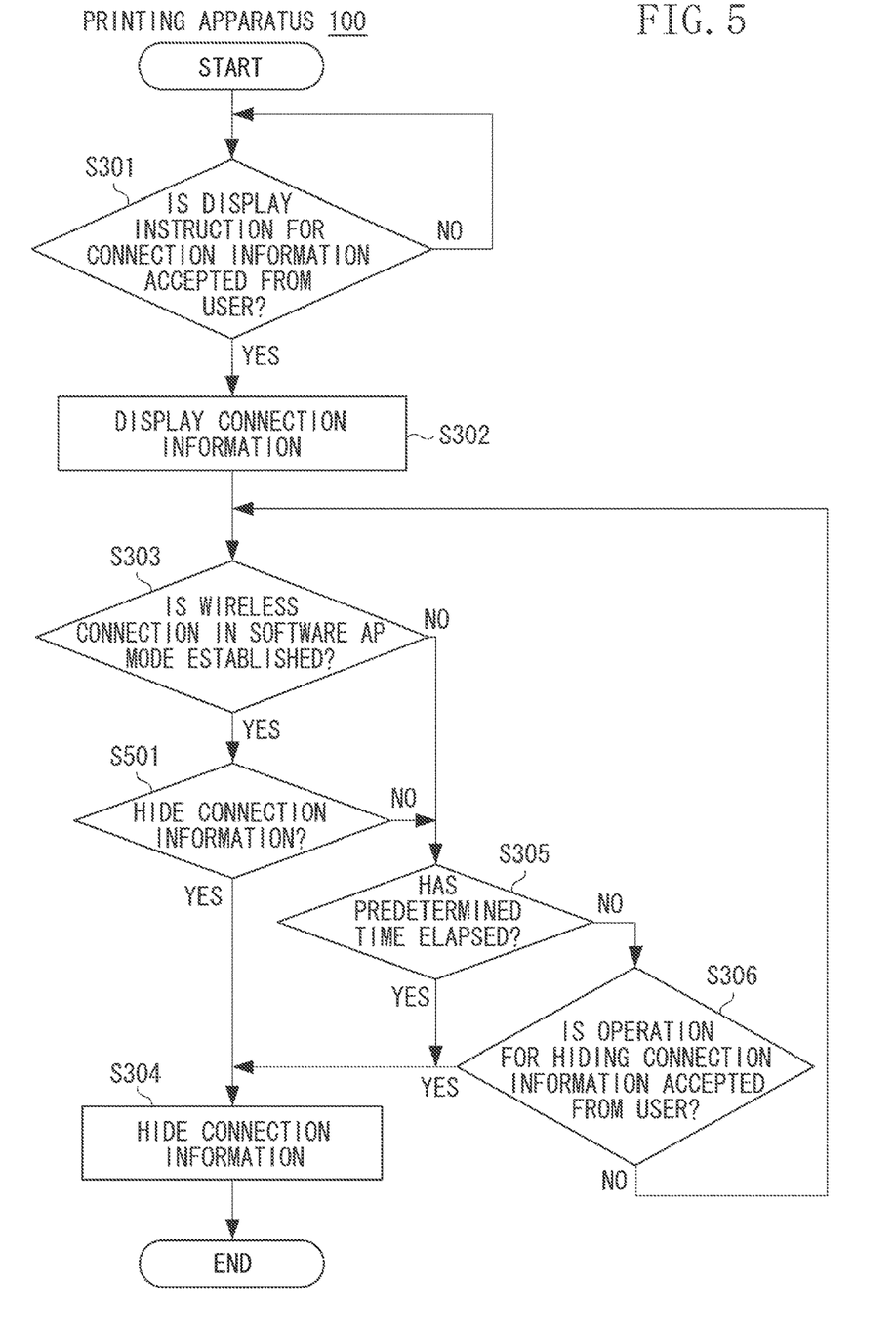
FIG. 5 is a flowchart illustrating processing performed by the printing apparatus according to a second exemplary embodiment.

Next, processing according to the present exemplary embodiment will be described with reference to a flowchart of FIG. 5. Each step illustrated in the flowchart of FIG. 5 is processed by the CPU 101 loading a control program stored in a memory such as the ROM 102 into the RAM 103 and executing the control program. The processing according to the present exemplary embodiment is similar to that of the first exemplary embodiment, illustrated in FIG. 3. Differences will be described in detail. In the flowchart of FIG. 5, steps having the same numbers as those in the flowchart of FIG. 3 perform the same processing as that described in FIG. 3.

In step S303, the CPU 101 determines whether a wireless connection in the soft AP mode is established. If the CPU 101 determines that a wireless connection in the soft AP mode is established (YES in step S303), the processing proceeds to step S501. In step S501, the CPU 101 determines whether to hide the displayed connection information. In the present exemplary embodiment, the CPU 101 determines whether to hide the displayed connection information according to the setting result of the setting screen 400 stored in a memory, such as the HDD 104.

If the icon 401 is selected as the setting result of the setting screen 400, the CPU 101 determines to hide the connection information (YES in step S501), and the processing proceeds to step S304. In step S304, the CPU 101 hides the displayed connection information. On the other hand, if the icon 402 is selected as the setting result of the setting screen 400, the CPU 101 determines not to hide the connection information (NO in step S501), and the processing proceeds to step S305.

As described above, according to the present exemplary embodiment, if a wireless connection in the soft AP mode is established, the connection information can be left displayed instead of the connection information being hidden without exception. In other words, the user can, based on, for example, the use environment of the printing apparatus 100, switch between hiding and continuing to display the connection information when a wireless connection is established.

OTHER EXEMPLARY EMBODIMENTS

In the above-described exemplary embodiments, the soft AP mode is described as a specific example of the direct wireless communication mode in which the printing apparatus 100 and the mobile terminal 120 perform direct wireless communication. However, other wireless communication methods may be used. For example, in Wi-Fi Direct®, the printing apparatus 100 can also behave as an access point. An exemplary embodiment of the present invention can thus be applied to Wi-Fi Direct®.

In the above-described exemplary embodiments, the configuration is described to display the SSID and the key as the connection information required to establish a wireless connection in the direct wireless communication mode. However, only the SSID may be displayed without the key being displayed.

Figure 6:
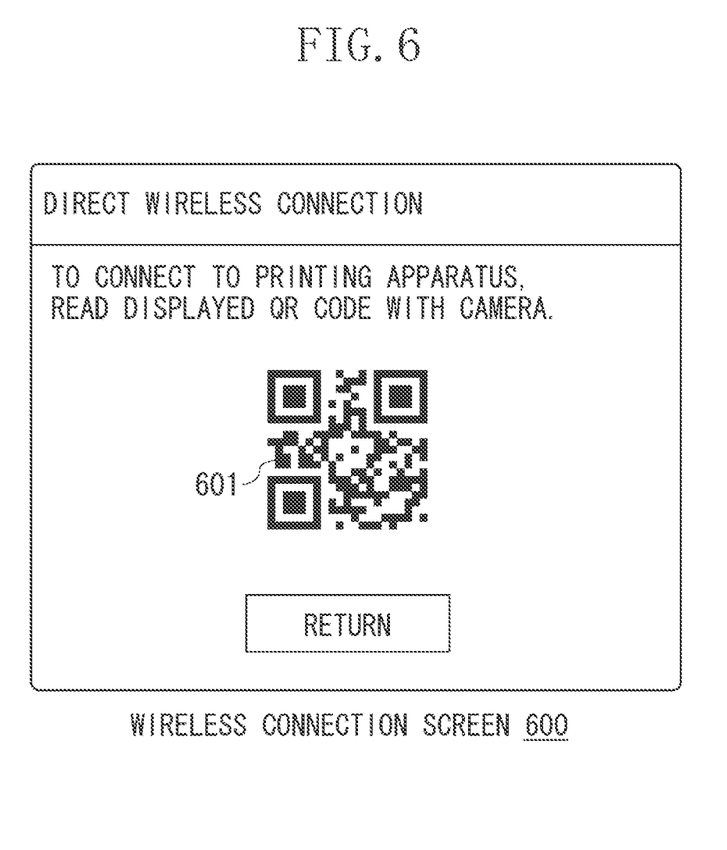
FIG. 6 is a diagram illustrating a screen displayed by the printing apparatus.

In the above-described exemplary embodiments, the configuration is described to display the connection information in such a form that the user can recognize the connection information. However, the connection information may be displayed in other forms. For example, like a wireless connection screen 600 of FIG. 6, the CPU 101 may generate a code image 601 representing the SSID and the key, and display the code image 601 as the connection information. In the case of the wireless connection screen 600, the user can obtain the connection information by reading the code image 601 with a camera of the mobile terminal 120. While the QR Code® is described as a specific example of the code image 601 displayed on the wireless connection screen 600, other types of code images may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-095887, filed May 8, 2015, which is hereby incorporated by reference herein in its entirety.

What is claimed is:

1. An image processing apparatus capable of communicating with an external apparatus by direct wireless communication without using an access point of another apparatus, the image processing apparatus comprising:
a wireless network interface that is able to be used for the direct wireless communication;
a display that displays information;
a memory that stores instructions; and
a processor that executes the instructions to:
cause the display to display an information screen including key information that is used for establishing a wireless connection of the direct wireless communication; and
cause the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

2. The image processing apparatus according to claim 1, wherein, in a case where a predetermined setting is made in the image processing apparatus, the processor causes the display not to display the key information displayed by the display according to establishment of the wireless connection, and
wherein, in a case where the predetermined setting is not made in the image processing apparatus, the key information is to be continuously displayed until a predetermined condition is satisfied after the wireless connection is established.

3. The image processing apparatus according to claim 1, wherein the menu screen does not include the key information.

4. The image processing apparatus according to claim 1, wherein the information screen further includes a service set identifier (SSID).

5. The image processing apparatus according to claim 1, wherein the information screen further includes a message that prompts the user to input the key information into the external apparatus.

6. The image processing apparatus according to claim 1, further comprising:
a printing device configured to form an image on a sheet, wherein the processor is further configured to execute the instructions to:
cause the printing device to print an image based on print data transmitted from the external device via the wireless connection.

7. The image processing apparatus according to claim 1, wherein the direct wireless communication is available for use when the image processing apparatus is set in a software access point mode among a plurality of modes.

8. The image processing apparatus according to claim 7, further comprising:
a printing device configured to form an image on a sheet, wherein, on the menu screen, it is possible to specify at least a function for which the printing device is used.

9. The image processing apparatus according to claim 1, wherein the direct wireless communication is Wi-Fi Direct communication.

10. The image processing apparatus according to claim 1, further comprising:
a printing device configured to form an image on a sheet, wherein, on the menu screen, it is possible to specify at least a function for which the printing device is used.

11. The image processing apparatus according to claim 1, further comprising:
a scanner device configured to read an image from a document,
wherein, on the menu screen, it is possible to specify at least a function for which the scanning device is used.

12. A method for controlling an image processing apparatus capable of communicating with an external apparatus by direct wireless communication without using an access point of another apparatus, the image processing apparatus having a wireless network interface that is able to be used for the direct wireless communication, and a display for displaying information, the method comprising:
causing the display to display an information screen including key information that is used for establishing a wireless connection of the direct wireless communication; and
causing the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

13. A non-transitory computer readable storage medium storing computer executable instructions for causing a computer to perform a control method of an image processing apparatus capable of communicating with an external apparatus by direct wireless communication without using an access point of another apparatus, the image processing apparatus having a wireless network interface that is able to be used for the direct wireless communication, and a display for displaying information, the control method comprising:
causing the display to display an information screen including key information that is used for establishing a wireless connection of the direct wireless communication; and
causing the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

14. An image processing apparatus capable of communicating with an external apparatus by direct wireless communication without using an access point of another apparatus, the image processing apparatus comprising:
a wireless network interface that is able to be used for the direct wireless communication;
a display that displays information;
a memory that stores instructions; and
a processor that executes the instructions to:
cause the display to display an information screen including a barcode for enabling the external apparatus to acquire at least key information, the key information being used for establishing a wireless connection of the direct wireless communication; and
cause the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

15. The image processing apparatus according to claim 14,
wherein the barcode enables the external apparatus to acquire a service set identifier (SSID) in addition to the key information.

16. The image processing apparatus according to claim 14,
wherein the information screen further includes a message that prompts the user to capture the barcode using a camera of the external apparatus.

17. The image processing apparatus according to claim 14, wherein the barcode is a QR code.

18. The image processing apparatus according to claim 14, further comprising:
a printing device configured to form an image on a sheet,
wherein the processor is further configured to execute the instructions to:
cause the printing device to print an image based on print data transmitted from the external device via the wireless connection.

19. The image processing apparatus according to claim 14, wherein the direct wireless communication is available for use when the image processing apparatus is set in a software access point mode among a plurality of modes.

20. The image processing apparatus according to claim 14, wherein the direct wireless communication is Wi-Fi Direct communication.

21. The image processing apparatus according to claim 14, further comprising:
a printing device configured to form an image on a sheet,
wherein, on the menu screen, it is possible to specify at least a function for which the printing device is used.

22. The image processing apparatus according to claim 14, further comprising:
a scanner device configured to read an image from a document,
wherein, on the menu screen, it is possible to specify at least a function for which the scanning device is used.

23. A method for controlling an image processing apparatus capable of communicating with an external apparatus by direct wireless communication without using an access point of another apparatus, the image processing apparatus having a wireless network interface that is able to be used for the direct wireless communication, and a display that displays information, the method comprising:
causing the display to display an information screen including a barcode for enabling the external apparatus to acquire at least key information, the key information being used for establishing a wireless connection based of the direct wireless communication; and
causing the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

24. A non-transitory computer readable storage medium storing computer executable instructions for causing a computer to perform a control method of an image processing apparatus capable of communicating with an external apparatus by direct wireless communication without using an access point of another apparatus, the image processing apparatus having a wireless network interface that is able to be used for the direct wireless communication, and a display that displays information, the control method comprising:

causing the display to display an information screen including a barcode for enabling the external apparatus to acquire at least key information, the key information being used for establishing a wireless connection of the direct wireless communication; and causing the display to execute, automatically without receiving a user instruction, displaying a message window in response to establishment of the wireless connection, wherein a message regarding the establishment of the wireless connection and a selection object are arranged in the message window, and wherein a shift to a menu screen on which it is possible to specify a function to be used from among a plurality of functions of the image processing apparatus occurs when the selection object is selected.

* * * * *